(12) United States Patent
Mann et al.

(10) Patent No.: US 9,112,800 B2
(45) Date of Patent: Aug. 18, 2015

(54) INVERSE MESSAGE CONTEXT OBJECTS

(75) Inventors: Robert A. Mann, Carp (CA); Peter K. Jorgensen, Nepean (CA); Darryl W. Jaakkola, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 334 days.

(21) Appl. No.: 13/602,505

(22) Filed: Sep. 4, 2012

(65) Prior Publication Data

US 2014/0068100 A1 Mar. 6, 2014

Related U.S. Application Data

(63) Continuation-in-part of application No. 13/482,690, filed on May 29, 2012, and a continuation-in-part of application No. 13/482,597, filed on May 29, 2012, now Pat. No. 8,797,902.

(51) Int. Cl.
*H04L 12/725* (2013.01)
*H04L 29/08* (2006.01)

(52) U.S. Cl.
CPC ............. *H04L 45/306* (2013.01); *H04L 45/308* (2013.01); *H04L 67/327* (2013.01)

(58) Field of Classification Search
CPC ..... H04L 12/56; H04L 45/306; H04L 45/308; H04L 67/327
USPC .................................. 709/238; 370/216, 392
See application file for complete search history.

(56) References Cited

U.S. PATENT DOCUMENTS

| 8,787,382 | B2 * | 7/2014 | Mann et al. | 370/392 |
| 8,792,329 | B2 * | 7/2014 | Kanode et al. | 370/216 |
| 8,799,391 | B2 * | 8/2014 | Craig et al. | 709/206 |

OTHER PUBLICATIONS

3GPP TS 29.212 "3rd Generation Partnership Project; Technical Specification Group Core Network and Terminals; Policy and Charging Control Over Gx Reference Point (Release 9)", No. V9.1.0, 2009, pp. 1-106.

3GPP TS 29.213 "3rd Generation Partnership Project; Technical Specification Group Core Network and Terminals; Policy and Charging Control Signalling Flows and QoS Parameter Mapping (Release 8)", No. V8.6.0, 2009, pp. 1-122.

3GPP TS 29.214 "3rd Generation Partnership Project; Technical Specification Group Core Network and Terminals; Policy and Charging Control Over Rx Reference Point (Release 9)", No. V9.2.0, 2009, pp. 1-44.

* cited by examiner

*Primary Examiner* — Ario Etienne
*Assistant Examiner* — Sahera Halim
(74) *Attorney, Agent, or Firm* — Kramer & Amado, P.C.

(57) ABSTRACT

Various exemplary embodiments relate to a method and related network node including one or more of the following: receiving a Diameter message at the DRA from an origin device; determining a received message type of the received Diameter message; determining an inverse message type based on the received message type; establishing an inverse message context object based on the inverse message type, wherein the inverse message context object provides access to a related Diameter message of the received Diameter message; processing the received Diameter message, wherein processing includes accessing the inverse message context object; and transmitting a message based on the processing.

20 Claims, 6 Drawing Sheets

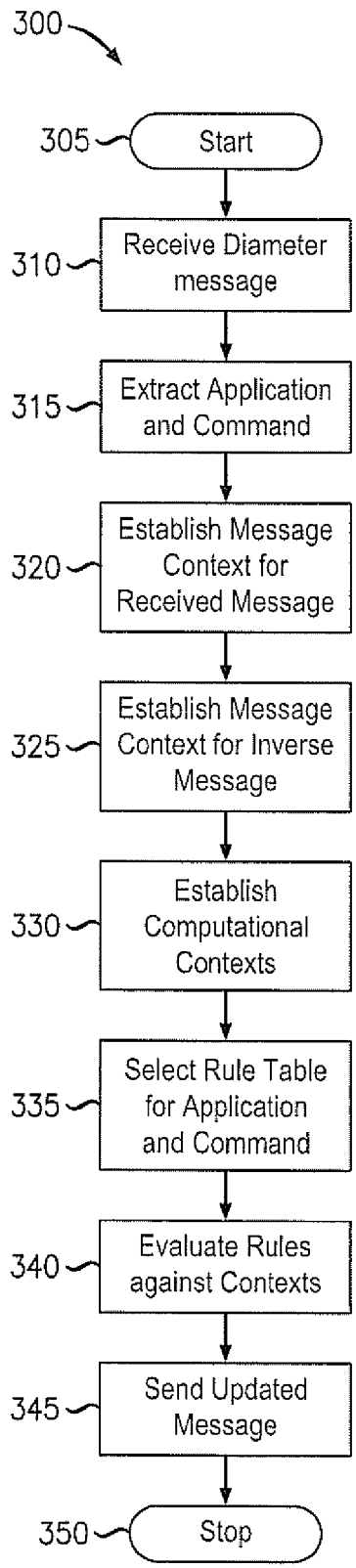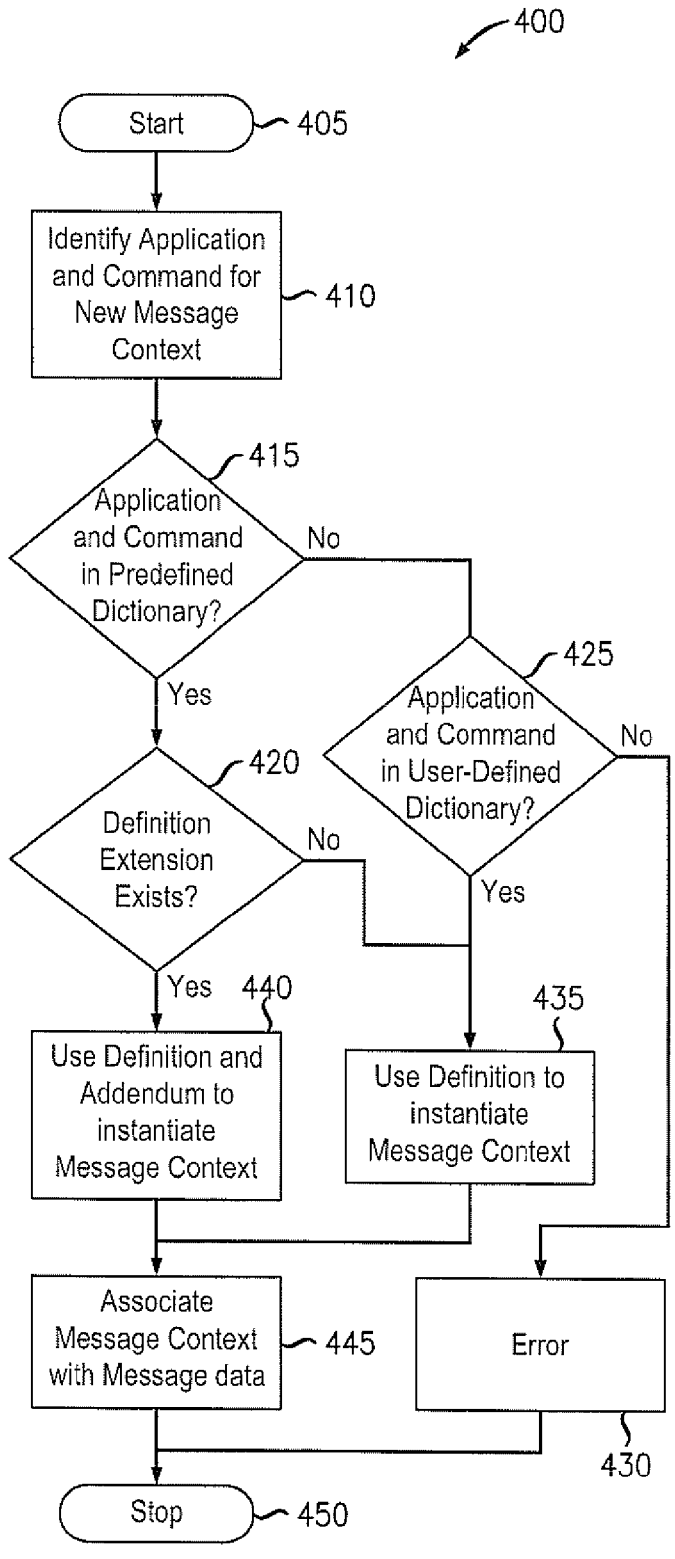
FIG. 3
FIG. 4

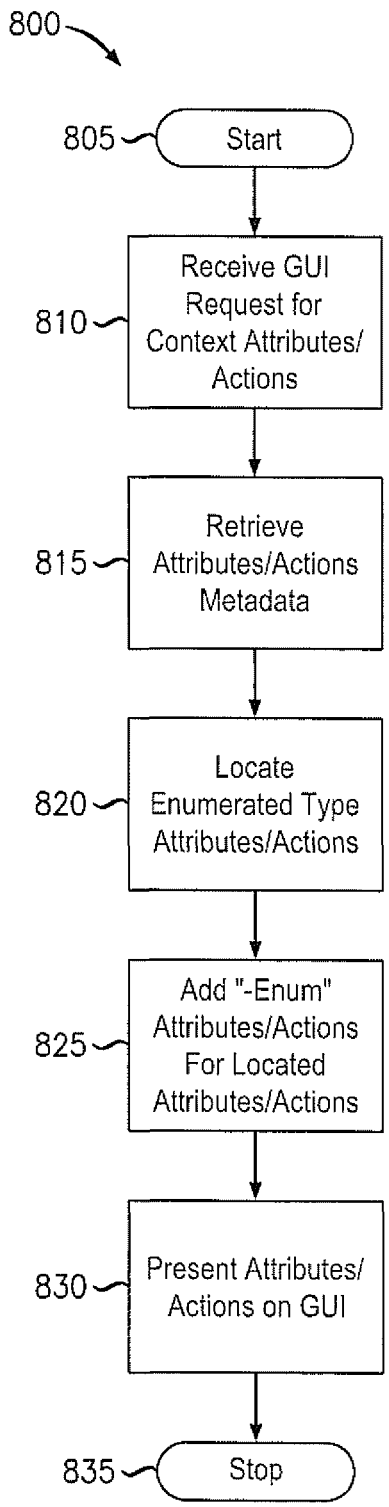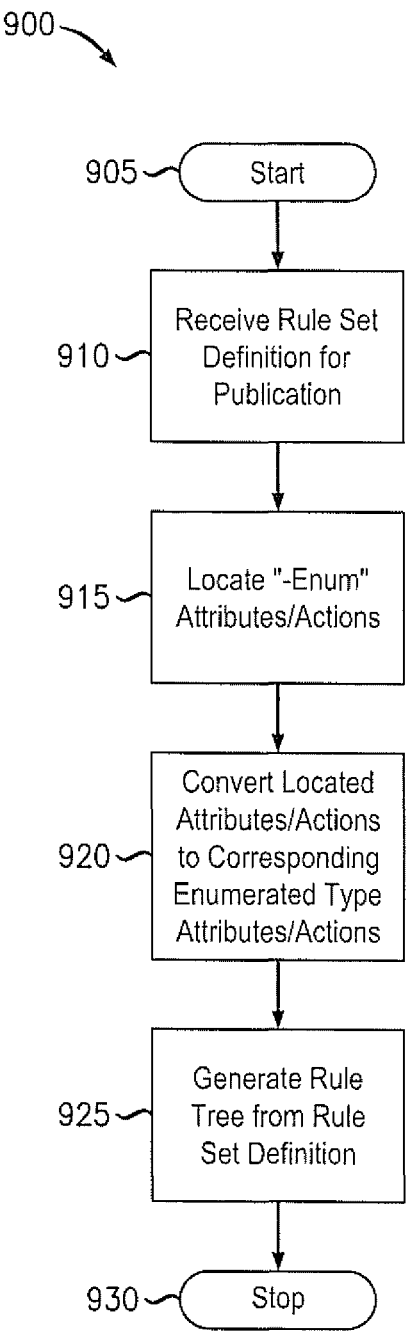
FIG. 8
FIG. 9

INVERSE MESSAGE CONTEXT OBJECTS

CROSS-REFERENCE TO RELATED APPLICATIONS

This application is related to the following co-pending applications, which are hereby incorporated herein by reference for all purposes: application Ser. No. 13/602,467, "MULTIPLE FORM ENUMERATED ATTRIBUTES;" application Ser. No. 13/602,579, "RULE ENGINE EVALUATION OF CONTEXT OBJECTS;" and application Ser. No. 13/602,537, "RECEIVED MESSAGE CONTEXT OBJECTS."

This application is (a) a continuation-in-part of application Ser. No. 13/482,690, filed on May 29, 2012, and (b) a continuation-in-part of application Ser. No. 13/482,597, filed on May 29, 2012. The entire disclosures of these applications are hereby incorporated herein by reference for all purposes.

TECHNICAL FIELD

Various exemplary embodiments disclosed herein relate generally to computer networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Diameter Routing Agent (DRA) for processing a Diameter message, the method including: receiving a Diameter message at the DRA from an origin device; establishing a context object in response to receiving the Diameter message; evaluating a rule that includes a context object reference, wherein the evaluation includes accessing the context object based on the context object reference; and transmitting a message based on the evaluation of the rule.

Various exemplary embodiments relate to a Diameter Routing Agent (DRA) for processing a Diameter message, the DRA including: a rule storage configured to store a rule that includes a context object reference; a Diameter stack configured to receive a Diameter message from an origin device; a context creator configured to establish a context object based on receiving the Diameter message; a rule engine configured to evaluate the rule, wherein the evaluation includes accessing the context object based on the context object reference; and a message handler configured to transmit, via the Diameter stack, a message based on the evaluation of the rule.

Various exemplary embodiments relate to a non-transitory machine-readable storage medium encoded with instructions for execution by a Diameter Routing Agent (DRA) for processing a Diameter message, the medium including: instructions for receiving a Diameter message at the DRA from an origin device; instructions for establishing a context object based on receiving the Diameter message; instructions for evaluating a rule that includes a context object reference, wherein the evaluation includes accessing the context object based on the context object reference; and instructions for transmitting a message based on the evaluation of the rule.

Various embodiments additionally include, before establishing the context object: receiving, via a user interface, a definition of the rule, wherein the definition specifies the context object reference.

Various embodiments are described wherein the rule includes a criteria portion that includes the context object reference and evaluating the rule includes: reading an attribute of the context object based on the reference; and determining that the rule is applicable to the Diameter message based on the attribute.

Various embodiments are described wherein the rule includes a result portion that includes the context object reference and evaluating the rule includes invoking an action of the context object based on the reference.

Various embodiments are described wherein the action of the context object modifies the Diameter message and transmitting the message based on the evaluation of the rule includes forwarding the Diameter message to another device.

Various embodiments are described wherein: the Diameter message is a Diameter request message, the action of the context object modifies a Diameter answer message, and transmitting the message based on the evaluation of the rule includes sending the Diameter answer message to the origin device.

Various embodiments are described wherein: evaluating the rule includes identifying a destination device for the Diameter message, and transmitting the message based on the evaluation of the rule includes forwarding the Diameter message to the destination device.

Various exemplary embodiments relate to a method performed by a Diameter Routing Agent (DRA) for processing a Diameter message, the method including: receiving a Diameter message at the DRA from an origin device; determining a message type of the Diameter message; establishing a message context object based on the message type, wherein the message context object provides access to the Diameter message; processing the Diameter message, wherein processing includes accessing the message context object; and transmitting a message based on processing.

Various exemplary embodiments relate to a Diameter Routing Agent (DRA) for processing a Diameter message, the DRA including: a Diameter stack configured to receive a Diameter message from an origin device; a message handler configured to determine a message type of the Diameter message; a context creator configured to establish a message context object based on the message type, wherein the message context object provides access to the Diameter message; and a processing engine configured to process the Diameter message, wherein processing includes accessing the message context object, wherein the message handler is further configured to transmit a message based on the processing.

Various exemplary embodiments relate to a non-transitory machine-readable storage medium encoded with instructions for execution by a Diameter Routing Agent (DRA) for processing a Diameter message, the medium including: instructions for receiving a Diameter message at the DRA from an origin device; instructions for determining a message type of the Diameter message; instructions for establishing a message context object based on the message type, wherein the message context object provides access to the Diameter message; instructions for processing the Diameter message, wherein processing includes accessing the message context object; and instructions for transmitting a message based on the processing.

Various embodiments are described wherein the determining the message type includes extracting an identification of an application and an identification of a command from the Diameter message.

Various embodiments are described wherein establishing the message context object based on the message type includes: locating a message definition for the message type; establishing the message context object based on the message definition; and associating the message context object with the Diameter message.

Various embodiments additionally include, before establishing the message context object receiving, via a user interface, the message definition, wherein the message definition specifies a structure of Diameter messages having the message type.

Various embodiments are described wherein: establishing the message context object based on the message type further includes locating an extension definition associated with the message definition, and establishing the message context object based on the message definition includes establishing the message context object based on the message definition and the extension definition.

Various embodiments are described wherein the Diameter message is associated with an identification of a vendor and the extension definition is associated with the identification of the vendor.

Various embodiments are described wherein processing the Diameter message includes accessing an action of the message context object, wherein the action modifies the Diameter message, and transmitting a message based on the processing includes transmitting the Diameter message to another device.

Various exemplary embodiments relate to a method performed by a Diameter Routing Agent (DRA) for processing a Diameter message, the method including: receiving a Diameter message at the DRA from an origin device; determining a received message type of the received Diameter message; determining an inverse message type based on the received message type; establishing an inverse message context object based on the inverse message type, wherein the inverse message context object provides access to a related Diameter message of the received Diameter message; processing the received Diameter message, wherein processing includes accessing the inverse message context object; and transmitting a message based on the processing.

Various exemplary embodiments relate to a Diameter routing agent (DRA) for processing a Diameter message, the DRA including: a Diameter stack configured to receive a Diameter message at the DRA from an origin device; a message handler configured to: determine a received message type of the received Diameter message, and determine an inverse message type based on the received message type; a context creator configured to establish an inverse message context object based on the inverse message type, wherein the inverse message context object provides access to a related Diameter message of the received Diameter message; and a processing engine configured to process the received Diameter message, wherein processing includes accessing the inverse message context object, wherein the message handler is further configured to transmit a message based on the processing.

Various exemplary embodiments relate to a non-transitory machine-readable storage medium encoded with instructions for execution by a Diameter Routing Agent (DRA) for processing a Diameter message, the medium including: instructions for receiving a Diameter message at the DRA from an origin device; instructions for determining a received message type of the received Diameter message; instructions for determining an inverse message type based on the received message type; instructions for establishing an inverse message context object based on the inverse message type, wherein the inverse message context object provides access to a related Diameter message of the received Diameter message; instructions for processing the received Diameter message, wherein processing includes accessing the inverse message context object; and instructions for transmitting a message based on the processing.

Various embodiments are described wherein establishing the inverse message context includes: locating a message definition for the inverse message type; establishing the inverse message context object based on the message definition; and associating the inverse message context object with the related Diameter message.

Various embodiments are described wherein the received Diameter message is a Diameter request message, the method further including generating a new Diameter answer message as the related Diameter message of the Diameter request message.

Various embodiments are described wherein: processing the received Diameter message includes invoking an action of the inverse message context object, wherein the action modifies the Diameter answer message, and transmitting the message based on the processing includes transmitting the Diameter answer message to the origin device.

Various embodiments are described wherein the received Diameter message is a Diameter answer message, the method further including retrieving a previously processed Diameter request message as the related Diameter message of the Diameter answer message.

Various embodiments are described wherein: processing the received Diameter message includes reading an attribute of the inverse message context object, and transmitting the message based on the processing includes transmitting the Diameter answer message to another device.

Various embodiments are described wherein processing the received Diameter message includes evaluating a rule that includes a reference to the inverse message context object, wherein the evaluation includes accessing the inverse message context object based on the reference.

Various exemplary embodiments relate to a method performed by a Diameter Routing Agent (DRA) for enabling a user to define message processing rules, the method including: receiving, via a user interface of the DRA, a request to define a rule; retrieving metadata associated with a context object; determining that a component specified by the metadata is an enumerated type component; presenting, via the user interface, a first displayed component for the enumerated type component, wherein the first displayed component is associated with a numeric value; presenting, via the user interface, a second displayed component for the enumerated type component, wherein the second displayed component is associated with an alphanumeric value; and receiving, via the user interface, a rule definition, wherein receiving the rule definition includes receiving a selection of at least one of the first displayed component and the second displayed component.

Various exemplary embodiments relate to a Diameter Routing Agent (DRA) for enabling a user to define message processing rules, the DRA including: a user interface configured to: receive a request to define a rule; retrieve metadata associated with a context object; determine that a component specified by the metadata is an enumerated type component; present a first displayed component for the enumerated type component, wherein the first displayed component is associated with a numeric value; present a second displayed component for the enumerated type component, wherein the second displayed component is associated with an alphanumeric value; and receive a rule definition, wherein receiving the rule definition includes receiving a selection of at least one of the first displayed component and the second displayed component.

Various exemplary embodiments relate to a non-transitory machine-readable storage medium encoded with instructions for execution by a Diameter Routing Agent (DRA) for enabling a user to define message processing rules, the medium including: instructions for receiving, via a user interface of the DRA, a request to define a rule; instructions for retrieving metadata associated with a context object; instructions for determining that a component specified by the metadata is an enumerated type component; instructions for presenting, via the user interface, a first displayed component for the enumerated type component, wherein the first displayed component is associated with a numeric value; instructions for presenting, via the user interface, a second displayed component for the enumerated type component, wherein the second displayed component is associated with an alphanumeric value; and instructions for receiving, via the user interface, a rule definition, wherein receiving the rule definition includes receiving a selection of at least one of the first displayed component and the second displayed component.

Various embodiments are described wherein the enumerated type component includes at least one of an attribute and an action.

Various embodiments additionally include presenting a set of possible alphanumeric values in association with the second displayed component.

Various embodiments are described wherein: the second displayed component is associated with a set of possible alphanumeric values and each alphanumeric value of the set corresponds to a numeric value, the receiving a selection of at least one of the first displayed component and the second displayed component includes receiving a selection of the first displayed component, and the receiving the rule definition includes receiving a specified numeric value for the first displayed component, wherein the specified numeric value does not correspond to any alphanumeric value of the set.

Various embodiments are described wherein: the second displayed component is associated with a set of possible alphanumeric values and each alphanumeric value of the set corresponds to a numeric value, and the receiving a selection of at least one of the first displayed component and the second displayed component includes receiving a selection of the second displayed component, and the receiving the rule definition includes receiving a specified alphanumeric value of the set for the second displayed component; the method further including: converting the specified alphanumeric value into a corresponding numeric value; and storing the corresponding numeric value as part of the rule.

Various embodiments additionally include receiving a request to publish a rule set; and generating a rule tree based on the rule definition.

Various embodiments additionally include receiving a Diameter message at the DRA from an origin device; establishing the context object based on receiving the Diameter message; evaluating a rule associated with the rule definition, wherein the evaluation includes accessing the enumerated type component of the context object; and transmitting a message based on the evaluation of the rule.

BRIEF DESCRIPTION OF THE DRAWINGS

In order to better understand various exemplary embodiments, reference is made to the accompanying drawings, wherein:

FIG. 3 illustrates an exemplary method for processing Diameter messages;

FIG. 4 illustrates an exemplary method for establishing a message context object;

FIG. 8 illustrates an exemplary method for presenting enumerated context object components to a user; and FIG. 9 illustrates an exemplary method for publishing a rule set including references to enumerated context object components.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior.

Figure 1:
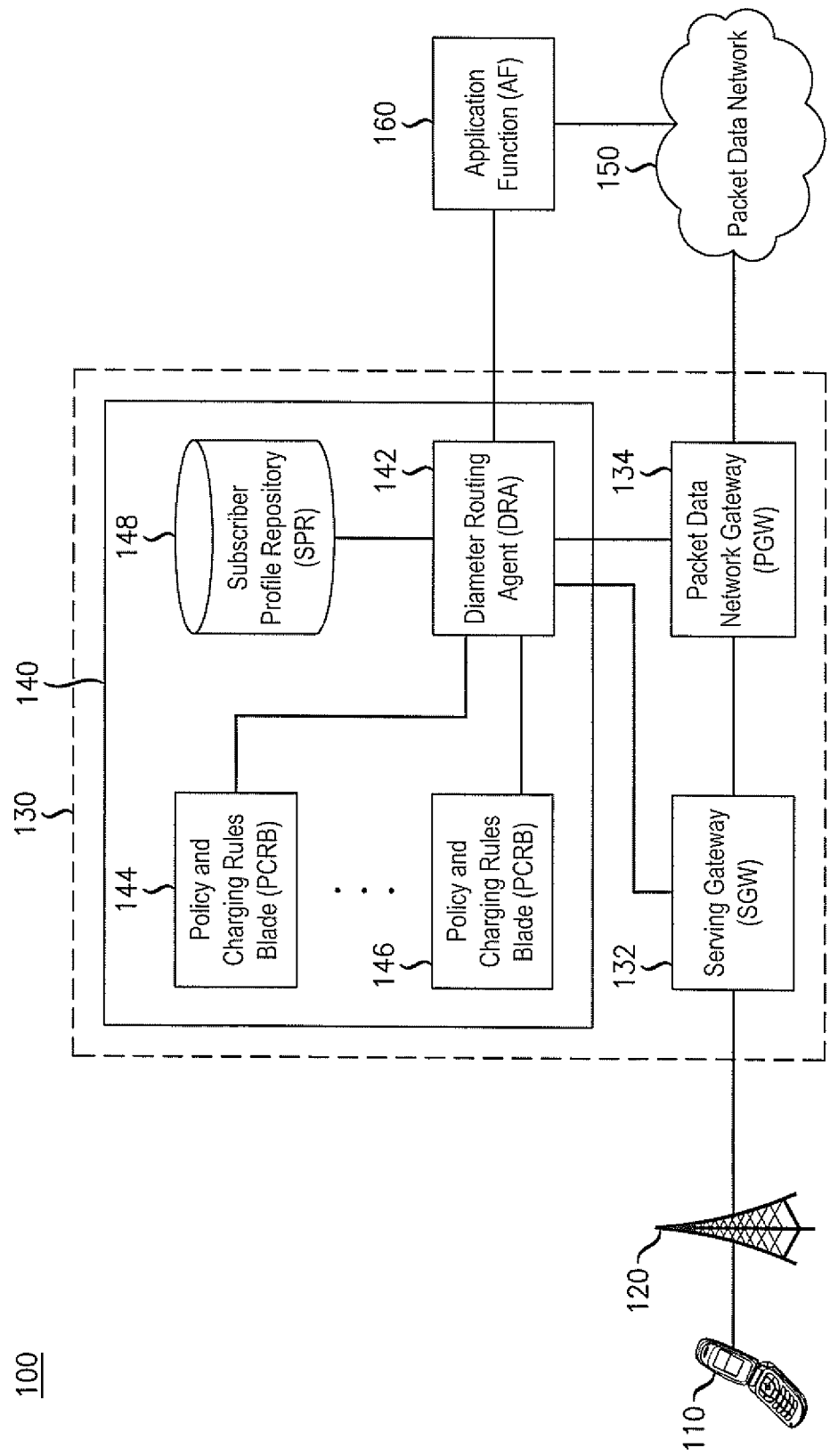
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
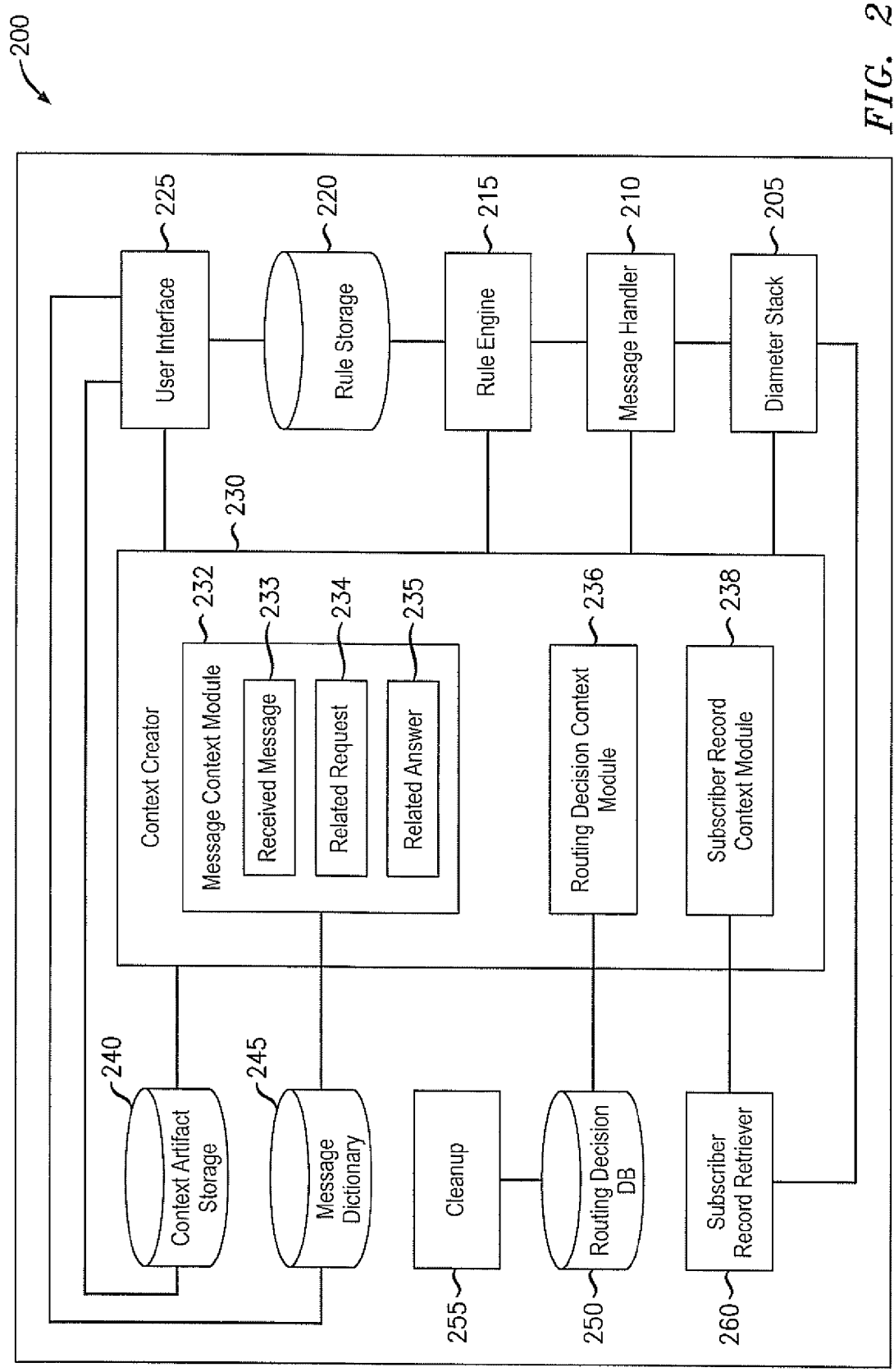
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, routing decision database 250, cleanup module 255, or subscriber record retriever 260.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from on the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After evaluating one or more rules, rule engine 215 may pass back an action to be taken or a message to be sent. Message handler 210 may then transmit one or more messages via Diameter stack 205, as indicated by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structures for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscriber profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a routing decision context, or a subscriber record context. These context artifacts may be used by context creator 230 at run-time to instantiate different types of context objects. As such, context creator 230 may be viewed as including a message context module 232, a routing decision context module 236, and a subscriber record context module 238. In various embodiments, a user may be able to define new context artifacts via user interface 225 for storage in context artifact storage, such as by specifying an existing file (e.g. a .jar file).

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an RX RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary 245, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse message type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting, via the API, that Diameter stack 205 construct the answer message. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As an example, routing decision context module 236 may be configured to instantiate a routing decision context object. Such routing decision context may identify, for each received Diameter message, a previously made routing decision that may be applicable to the received message. Such previously made routing decisions may be stored in routing decision database 250 along with a session identifier for correlating received messages to previously-processed messages. Routing decision database 250 may be any machine-readable medium capable of storing such routing decisions. Accordingly, routing decision database 250 may include a machine-readable storage medium such as read-only memory (ROM), random-access memory (RAM), magnetic disk storage media, optical storage media, flash-memory devices, and/or similar storage media.

Computational contexts may be supported by other DRA 200 functionality. For example, DRA 200 may include a cleanup module 255 that periodically removes stale entries from routing decision database 250. In some embodiments, the routing decision context object may not interact directly with cleanup module 255. Instead, cleanup module 255 may operate independently, while affecting the behavior of the routing decision context object indirectly by modifying the contents of routing decision database 250.

As another example of a computational context, subscriber record context module 238 may generate a subscriber record context object. The subscriber record context object may utilize other DRA 200 functionality, such as subscriber record retriever 260, to retrieve a subscriber record for received Diameter messages. Subscriber record retriever 260 may include hardware or executable instructions on a machine-readable storage medium configured to communicate with a subscriber profile repository (SPR) via Diameter stack 205 to retrieve a subscriber record for a Diameter message. Such communication may be performed, for example, according to the Sp application. Various methods of implementing subscriber record retriever 260 will be apparent. Through this retrieval of a subscriber record, the subscriber record context object may provide the rule engine 215 with access to the subscriber record It should be noted that while rule storage 220, context artifact storage 240, message dictionary 245, and routing decision database 250 are illustrated as separate devices, one or more of these components may be resident on multiple storage devices. Further, one or more of these components may share a storage device. For example, rule storage, context artifact storage 240, message dictionary 245, and routing decision database 250 may all refer to portions of the same hard disk or flash memory device.

FIG. 3 illustrates an exemplary method 300 for processing Diameter messages. Method 300 may be performed by the components of DRA 200 such as, for example, Diameter stack 205, message handler 210, rule engine 215, or context creator 230.

Method 300 may begin in step 305 and proceed to step 310 where the DRA 200 may receive a Diameter message to be processed. Next, in step 315, the DRA 200 may extract a message type from the received Diameter message. In various embodiments, the message type may be defined by the application and command type of the message. Then, in step 320, the DRA may use the extracted message type to establish a message context object to wrap the received Diameter message. In a similar manner, the DRA 200 may establish a message context object for an inverse of the Diameter message in step 325. For example, the DRA 200 may use a lookup table to identify the inverse message type of the extracted message type and request a new message context based on the inverse message type.

The DRA 200 may then, in step 330, proceed to establish any other computational context objects for which the DRA 200 stores a context artifact or which the rule engine may request. For example, the DRA 200 may establish a routing decision context object and a subscriber record context object. After the appropriate context objects have been at least instantiated, method 300 may proceed to step 335 where the DRA 200 may select one or more appropriate rule sets to evaluate in processing the received Diameter message. In various embodiments, the DRA 200 may store a rule set for each message type. In some embodiments, DRA 200 may additionally or alternatively store a rule set that is generally applicable to all Diameter messages, all Diameter messages of a particular application, or another subset of Diameter messages.

After identifying the appropriate rule sets, the DRA 200 may evaluate the selected rule set or tables against the instantiated contexts in step 340. The individual rules may include references to various components of the context objects, herein referred to as "context object references." Such components may constitute attributes or actions of the context objects. To evaluate a rule including such a reference, the DRA 200 may access the referenced component. For example, an attribute of a context object may be used in a comparison to determine whether a rule is applicable or an action of a context object may be used in applying the result of a rule. Various additional uses for a reference to a context object will be apparent. After applying the appropriate rule sets, the DRA 200 may transmit one or more messages to other devices in step 345. For example, the DRA 200 may forward the Diameter message, which may be modified, to another device or may transmit an answer back to the device that sent the received message. Method 300 may proceed to end in step 350.

FIG. 4 illustrates an exemplary method 400 for establishing a message context object. Method 400 may correspond to step 320 or step 325 of method 300. Method 400 may be performed by the components of DRA 200 such as, for example, context creator 230.

Method 400 may begin in step 405 and proceed to step 410 where the DRA 200 may identify the application and command for the new context object. For example, a context creator may receive the application and command from a message handler. Alternatively, a context creator may extract the application and command from the received Diameter message or identify an inverse message type for the message type of the received Diameter message. After determining a message type for the new context object, the DRA 200 may begin to locate a definition for the message type by querying the predefined message dictionary in step 415. If a predefined definition is available for the message type, method 400 may proceed to step 420, where the DRA 200 may attempt to locate an extension definition for the message type. If an extension definition exists, method 400 may proceed to step 440. In step 440, the DRA 200 may use both the predefined definition and extension definition to instantiate a new message context. For example, the DRA may instantiate a message context object having attributes and actions that correspond to the AVPs and other data specified by the two definitions as potentially being carried by a message having the relevant message type.

If, in step 415, the DRA 200 is unable to locate a predefined definition for the message type, method 400 may proceed instead to step 425. In step 425, the DRA 200 may attempt to locate a user-defined definition for the message types. If no such user-defined definition for the message type is available, method 400 may proceed to produce an error in step 430 and end in step 450.

If a user-defined definition is located in step 425 or if no extension definition is located in step 420, method 400 may proceed to step 435. In various embodiments, a user-defined definition may be syntactically similar to a predefined definition. In step 435, the DRA 200 may use the located definition, which may be predefined or user-defined, to instantiate a new message context. For example, the DRA 200 may instantiate a message context object having attributes and actions that correspond to the AVPs and other data specified by the definition as potentially being carried by a message having the relevant message type.

After instantiating the message context object in step 435 or step 440, method 400 may proceed to step 445. In step 445, the DRA 200 may associate the new message context object with message data. For example, if the message context object is associated with the received Diameter message, the DRA 200 may configure the context object to access fields of the received Diameter message stored in a Diameter stack. As another example, if the message context object is associated with an inverse message of the received Diameter message, such as a related request or a related answer, the DRA 200 may configure the context object to access fields of the inverse Diameter message stored in a Diameter stack. Method 400 may then proceed to end in step 450.

Various modifications to method 400 will be apparent to those of skill in the art. For example, the DRA 200 may establish a generic message context object in step 430 for use by the rule engine to provide at least some functionality. As another example, various embodiments may utilize extension definitions with respect to both predefined definitions and user-defined definitions. In such embodiments, method 400 may proceed from step 425 to step 420 when a user-defined definition is available.

As noted above, message types may be defined by various definitions. For example, a DRA may include one or more predefined definitions stored in a message dictionary by an equipment provider. In various embodiments, such predefined definitions may be stored as extensible markup language (XML) files. For example, a predefined definition for an Rx AAR message may read, in part:

```xml
<diameterDefinition xmlns="diameterDefinition"
xmlns:tns="diameterDefinitionContext">
    <application id="16777236" vendorName="IETF_IANA" name="Rx"
    stateful="true" support="AUTHORIZATION_REQUESTS">
        <commandSyntax name="AAR">
            <fixed index="0" attributeName="Session-Id" />
            <required attributeName="Auth-Application-Id" />
            <required attributeName="Origin-Host" />
            <required attributeName="Origin-Realm" />
            <required attributeName="Destination-Realm" />
            <optional attributeName="Destination-Host" />
            <optional attributeName="Media-Component-Description">
                <occurrence min="0" max="unbounded" />
            </optional>
            <optional attributeName="SIP-Forking-Indication" />
            <optional attributeName="Subscriber-ID">
                <occurrence min="0" max="unbounded" />
            </optional>
            <optional attributeName="Supported-Features">
                <occurrence min="0" max="unbounded" />
            </optional>
        </commandSyntax>
    </application>
    ...
    <attribute code="517" vendorName="3GPP" name="Media-Component-
    Description" format="GROUPED" mFlag="REQUIRED"
    pFlag="OPTIONAL" vFlag="REQUIRED" encrypt="true" register="true"
    proprietary="false">
        <groupedAttributeSyntax acceptsOtherAvps="false">
            <required attributeName="Media-Component-Number" />
            <optional attributeName="Media-Sub-Component">
                <occurrence min="0" max="unbounded" />
            </optional>
            <optional attributeName="AF-Application-Identifier" />
            <optional attributeName="Media-Type" />
            <optional attributeName="Max-Requested-Bandwidth-UL" />
            <optional attributeName="Max-Requested-Bandwidth-DL" />
            <optional attributeName="Flow-Status" />
            <optional attributeName="Reservation-Priority" />
            <optional attributeName="RS-Bandwidth" />
            <optional attributeName="RR-Bandwidth" />
            <optional attributeName="Codec-Data">
                <occurrence min="0" max="2" />
            </optional>
        </groupedAttributeSyntax>
    </attribute>
    <attribute code="518" vendorName="3GPP" name="Media-Component-
    Number" format="UNSIGNED32" mFlag="REQUIRED"
    pFlag="OPTIONAL" vFlag="REQUIRED" encrypt="true" register="true"
    proprietary="false" />
    <attribute code="519" vendorName="3GPP" name="Media-Sub-
    Component" format="GROUPED" mFlag="REQUIRED"
    pFlag="OPTIONAL" vFlag="REQUIRED" encrypt="true" register="true"
    proprietary="false">
        <groupedAttributeSyntax>
            <required attributeName="Flow-Number" />
                <optional attributeName="Flow-Description">
                <occurrence min="0" max="2" />
            </optional>
            <optional attributeName="Flow-Status" />
            <optional attributeName="Flow-Usage" />
            <optional attributeName="Max-Requested-Bandwidth-UL" />
            <optional attributeName="Max-Requested-Bandwidth-DL" />
            <optional attributeName="AF-Signalling-Protocol" />
        </groupedAttributeSyntax>
    </attribute>
    <attribute code="520" vendor Name="3GPP" name="Media-Type"
    format="ENUMERATED" mFlag="OPTIONAL" pFlag="OPTIONAL"
    vFlag="REQUIRED" encrypt="true" register="true" proprietary="false" />
</diameterDefinition>
```

The above example message definition may define the Rx AAR message as including a number of required and optional AVPs such as the Session-ID AVP and Media-Component-Description AVP. The above example message definition may also define the structure or of at least some AVPs that may be included within a Rx AAR, such as a Media-Component-Number AVP and Flow-Status AVP. Such AVPs may include a value or may be grouped and include additional AVPs. Various additional methods of defining the contents of a message type will be apparent. In various embodiments, user-defined definitions may include a similar syntax as the pre-defined message definition above. User-defined definitions may be provided by a user of the DRA, such as an administrator or the equipment provider after the equipment has been deployed.

As also noted above, a user may be able to extend message type definitions using extension definitions. Extension definitions may specify additional or alternative AVPs or other values that may be included as a part of a Diameter message of a particular message type. For example, some vendors may include proprietary AVPs within Rx AAR messages. In various embodiments, extension definitions may be stored as XML files. An extension definition for an Rx AAR message may read, in part:

```
<diameterDefinition xmlns="diameterDefinition"
xmlns:tns="diameterDefinitionContext">
    <!--
        A proprietary vendor
    -->
    <vendor id="12345678" name="PROPRIETARY_VENDOR" />
    <attribute code="777" vendorName="PROPRIETARY_VENDOR"
    name="My-Proprietary-Avp" format="UNSIGNED32"
    mFlag="OPTIONAL"
    pFlag="OPTIONAL" vFlag="REQUIRED" encrypt="true"
    register="true"
    proprietary="false" />
    <!--
        Put the proprietary AVP in Rx AAR
    -->
    <attributeParentCommand name="My-Proprietary-Avp"
    application="Rx"
    command="AAR" />
    <!--
        Put the Origin-Host AVP inside the
        Media-Component-Description AVP
    -->
    <attributeParentAttribute name="Origin-Host" parentName="Media-
    Component-Description" />
</diameterDefinition>
```

The above example extension definition may extend another definition of an Rx AAR message. The extension definition may define new types of AVPs and locations for such AVPs within the extended message type. For example, the above extension definition may define a new type of AVP, "My-Proprietary-Avp" as including an unsigned 32-bit integer, and specify that this AVP may be present in the top level of an Rx AAR message. Alternatively or additionally, the extension definition may specify new locations for already-defined AVPs. For example, the above extension definition may specify that the Origin-Host AVP may be present within a Media-Component-Description AVP.

As noted above, the predefined message dictionary, user-defined message dictionary, and extension dictionary may be stored in the same message dictionary storage device. In various embodiments, the definitions belonging to these dictionaries may be stored together in different directories of the message dictionary storage device.

Figure 5:
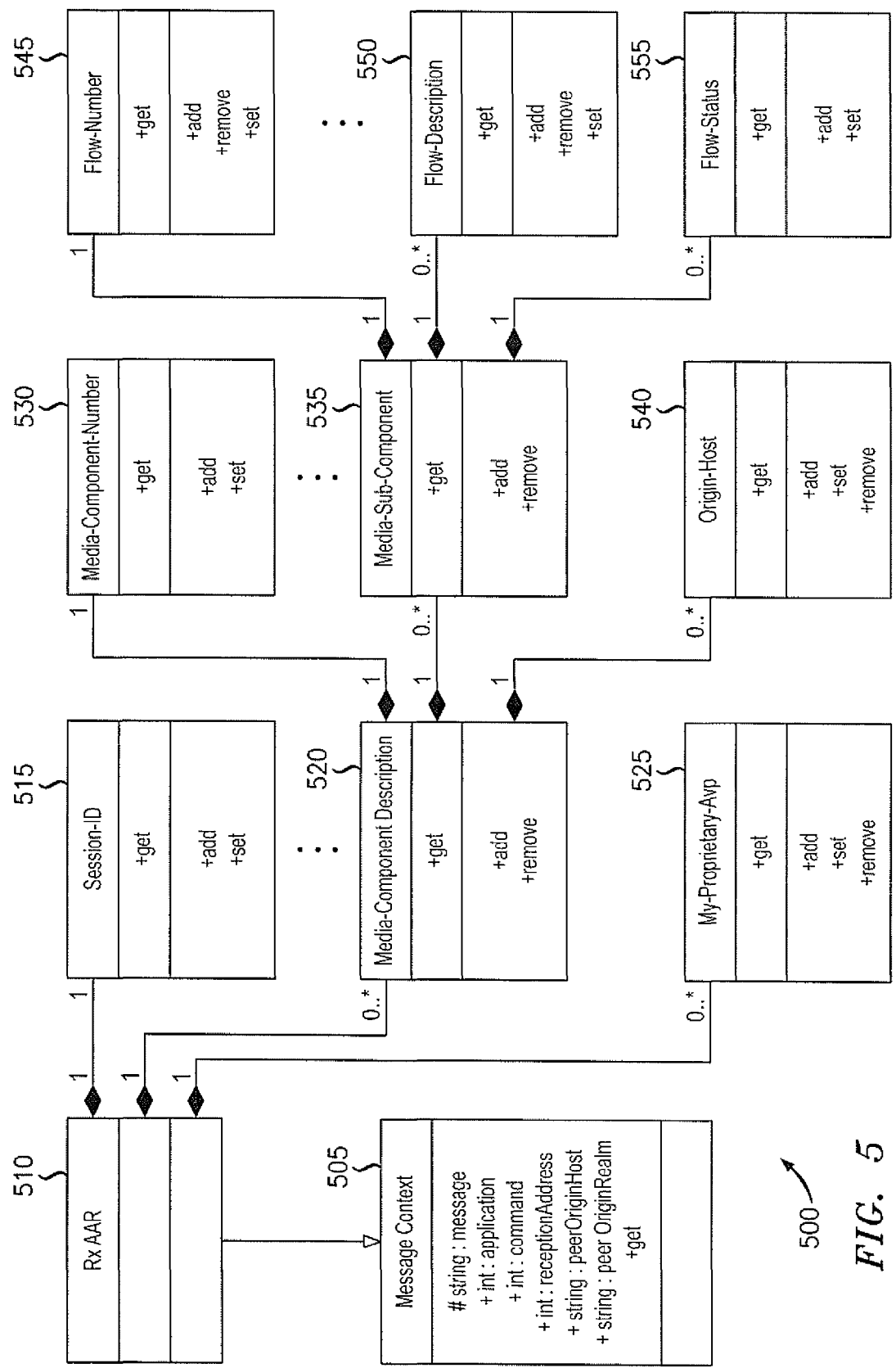
FIG. 5 illustrates an exemplary class diagram for a message context object.

FIG. 5 illustrates an exemplary class diagram 500 for a message context object. Class diagram 500 may represent a message context object instantiated based on the exemplary message definition and extension definition above. Rx AAR context object 510 may be associated with a received Rx AAR Diameter message currently being processed by the DRA 200 or may be associated with a previously processed Rx AAR Diameter message that is related to an Rx AAA currently being processed by the DRA. Class diagram 500 may indicate an actual implementation of a message context object or may describe a context object as viewed by a user even though an actual implementation differs. For example, as will be understood, a message context object may be implemented as a generic "Diameter message" class where the contents may include generic "AVP" objects that hold underlying binding data. Such AVP objects may be instantiated only on demand. Such an implementation may be accessible by a user in the same manner as an object implemented according to class diagram 500.

Rx AAR context object 510 may extend, or otherwise be a specific instantiation of a base message context object 505. Message context object 505 may define data and functions that may be generally used by any message context object regardless of the message type. In various embodiments, message context object 505 may provide access to the Diameter message by, for example, storing a protected copy of the Diameter message in a "message" variable or storing information sufficient to access the Diameter message actually stored by the Diameter stack.

Base message context object 505 may also provide various data related to the Diameter message, but not actually stored within the message, such as data associated with the message by the Diameter stack. For example, the message context object 505 may include public variables storing identifications of an application, command, reception address, peer origin host, and peer origin realm. The message context object 505 may also include a "get" attribute that may return a handle to the message object itself that may be used, for example, to access other objects contained within message context object 505. In various embodiments, a rule may simply reference the object name to access a "get" attribute, without specifying the "get" attribute itself. For example, a rule may reference "Rx AAR.Session-ID" to retrieve the Session-ID value, instead of "Rx AAR.Session-ID get."

Rx AAR context object 510 may inherit attributes or actions from message context 505, while including additional attributes or actions that are specific to an Rx AAR message. It will be understood that context objects instantiated based on other message type definitions or extension definitions may include different objects, as specified by those definitions. Thus, Rx AAR context object 510 may include a number of nested objects 515, 520, 525 representing various possible AVPs. For example, Rx AAR context object 510 may include a Session-ID object 515 corresponding to a Session-ID AVP. In various embodiments, the Session-ID AVP may be a required AVP of Rx AAR messages. As such, the Rx AAR context object 510 may include a single Session-ID object 515. The Session-ID object 515 may include a "get" attribute which may return a value of the Session-ID AVP of the associated Diameter message. The Session-ID object 515 may also include "add" or "set" actions to add or modify, respectively, a Session-ID AVP of the Rx AAR message. As noted above, the Session-ID AVP may be required for the Rx AAR. As such, the DRA may not instantiate the Session-ID object 515 with an action that removes the AVP from the Rx AAR message.

As further defined in the above exemplary message type definition, an Rx AAR message may include Media-Component-Description AVPs. This exemplary definition may specify that the Media-Component-Description AVP is optional. As such, Rx AAR object 510 may include zero or more Media-Component-Description objects 520. Media-Component-Description object 520 may include various attributes, such as a "get" attribute and various actions, such as "add" and "remove" actions. Because the exemplary message definition may specify that the Media-Component-Description AVP is a grouped type AVP, the DRA may not provide the Media-Component-Description object 520 with a "set" action.

Objects included within Rx AAR context object 510 may themselves include additional objects. For example, Media-Component-Description object 520 may include a number of additional objects such as Media-Component-Number object 530 or Media-Sub-Component object 535. As another example, Media-Sub-Component object 535 may include a number of additional objects such as Flow-Number object 545, Flow-Description object 550, and Flow-Status object 555. Each of these objects may include one or more attributes or actions. It will be understood that Rx AAR context object 510 may include numerous additional objects (not shown).

Rx AAR object 510 may also include various objects based on the exemplary extension definition above. For example, Rx AAR object 510 may include zero or more My-Proprietary-Avp objects 525. As another example, the Media-Component-Description object 520 may include zero or more Origin-Host objects 540. As with other objects specified by class diagram 500, My-Proprietary-Avp object 525 and Origin-Host object 540 may include various attributes or actions.

As explained above, a user may define various rules that include references to the attributes and actions of various context objects. For example, a user may specify a rule set by providing the following pseudocode rule definitions:

```
RULE SETS:
    Rx AAR
IF (RULE Session-IDCheck)
    (Rx AAR.Session-ID < 0x0A | | Rx AAR.Session-ID > 0x2A)
THEN
    Rx AAR.Session-ID set (Rx AAR.Session-ID + 0x10)
ELSE
    Rx AAR.Media-Component-Description.Media-Sub-Component.Flow-
        Description remove
    IF (RULE FlooberRule)
        Present(Rx AAR.Media-Component-Description.Media-Sub-
            Component)
    THEN
        Rx AAR.Media-Component-Description.Media-Sub-Component.Flow-
            Description add floober
    ELSE
        Rx AAA. Result-Code add 0x12
```

Upon receiving pseudocode defining a rule set, such as the above example, a DRA may generate a rule set in a form that may be more quickly or efficiently evaluated during runtime. Various alternative methods for enabling a user to define rules or a rule set will be apparent.

Figure 6:
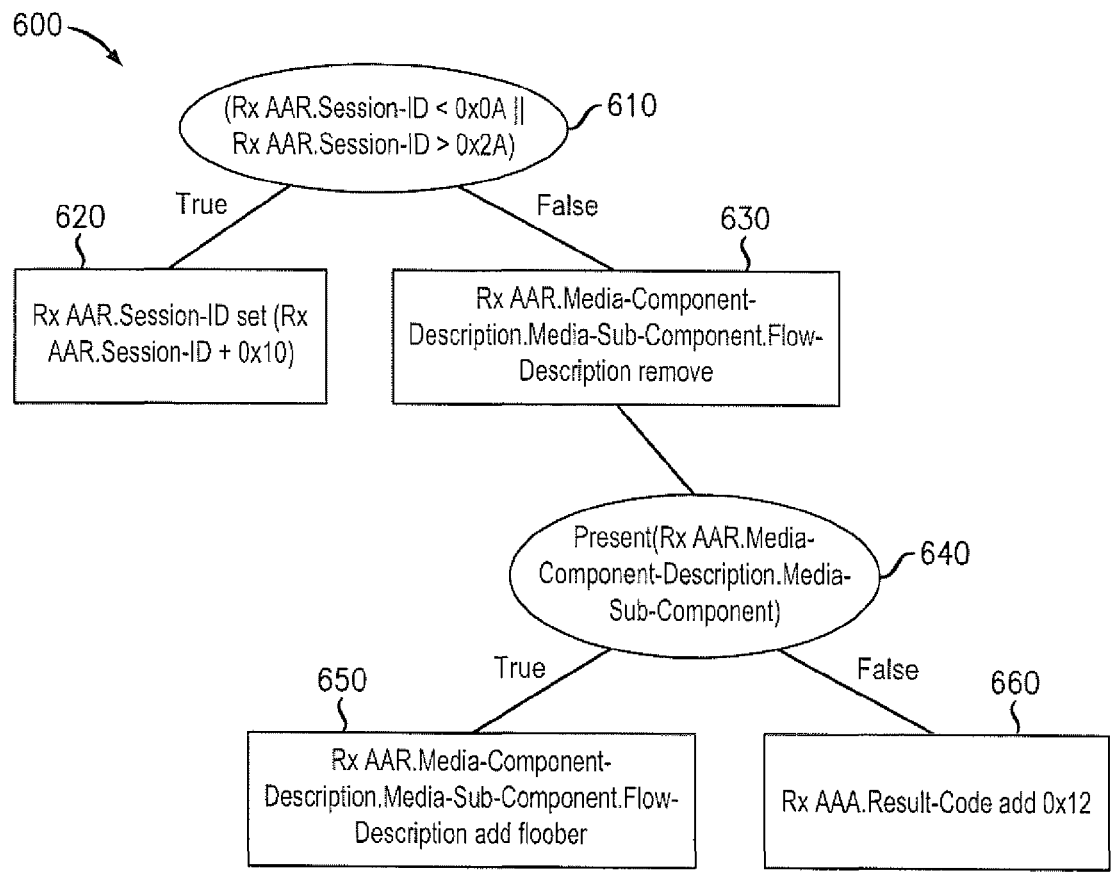
FIG. 6 illustrates an exemplary rule set for processing a Diameter message.

FIG. 6 illustrates an exemplary rule set 600 for processing a Diameter message. Rule set 600 may be stored in a rule storage such as rule storage 220 of DRA 200. In various embodiments, rule set 600 may be stored as a binary decision tree, as illustrated. It will be apparent that various alternative arrangements may be used for storing a rule set. For example, rule set 600 may be stored as a plurality of records that each include a criteria field for evaluation to determine whether a rule is applicable and a result field storing an action to be taken when the rule is applicable. Further, rule set 600 may be stored as, for example, a table in a database stored in rule storage 220. Alternatively, rule set 600 could be a series of linked lists, an array, or a similar data structure. Thus, it should be apparent that rule set 600 may be an abstraction of the underlying data; any data structure suitable for storage of this data may be used.

Rule set 600 may be applicable to Rx AAR Diameter messages. Rule set 600 may have been generated based on user-provided pseudo-code such as the above example. A DRA may store separate message type-specific rule sets (not shown) for a number of different message types. Rule set 600 may include criteria nodes such as criteria nodes 610, 640 and result nodes such as result nodes 620, 630, 650, 660. It will be apparent that rule set 600 is exemplary and that various embodiments may include rule sets (not shown) that are more complex than the rule set 600 as illustrated.

Criteria nodes may present a condition to be evaluated by a rule engine. Based on the evaluation, the rule engine may select another criteria node or a result node to evaluate. Result nodes may present one or more actions to be performed by a rule engine. Such actions may include, for example, modifying a Diameter message or transmitting a Diameter message to a particular device.

For example, criteria node 610 may store the condition "(Rx AAR.Session-ID <0x0A||Rx AAR.Session-ID>0x2A)" which may evaluate to "true" when the Session-ID of the "Rx AAR" context object is less than 0x0A or greater than 0x2A. When criteria node 610 evaluates to "true," a rule engine may evaluate result node 620. Such evaluation may include adding a value of 0x10 to the current value of the Session-ID AVP.

If criteria node 610 evaluates to false, the rule engine may evaluate result node 630. Such evaluation may include accessing a "remove" action for a Flow-Description AVP of the Rx AAR context object. The rule engine may then move on to criteria node 640. Criteria node 640 may include the condition "Present(Rx AAR.Media-Component-Description.Media-Sub-Component" which may evaluate to true when the Rx AAR object includes a Media-Component-Description AVP. When criteria node 640 evaluates to true, the rule engine may move on to result node 650 where the rule engine may add a Flow-Description AVP having a value of "floober" to the Rx AAR message. If criteria node 640 evaluates to false, the rule engine may move on to result node 660.

Result node 660 may access a related message context object instead of the message context object representing the received Diameter message. For example, result node 660 may specify that a rule engine should access a "set" action of an Rx AAA context object to set a Result-Code AVP to "0x12." In various embodiments, various modifications to a related message context object, such as setting a Result-Code AVP or Experimental-Result AVP, may inform the DRA 200 that the related answer message should be sent instead of forwarding the received Diameter message. For example, after evaluating result node 660, the DRA 200 may proceed to transmit an Rx AAA message back to the original sender of the received Rx AAR message.

Figure 7:
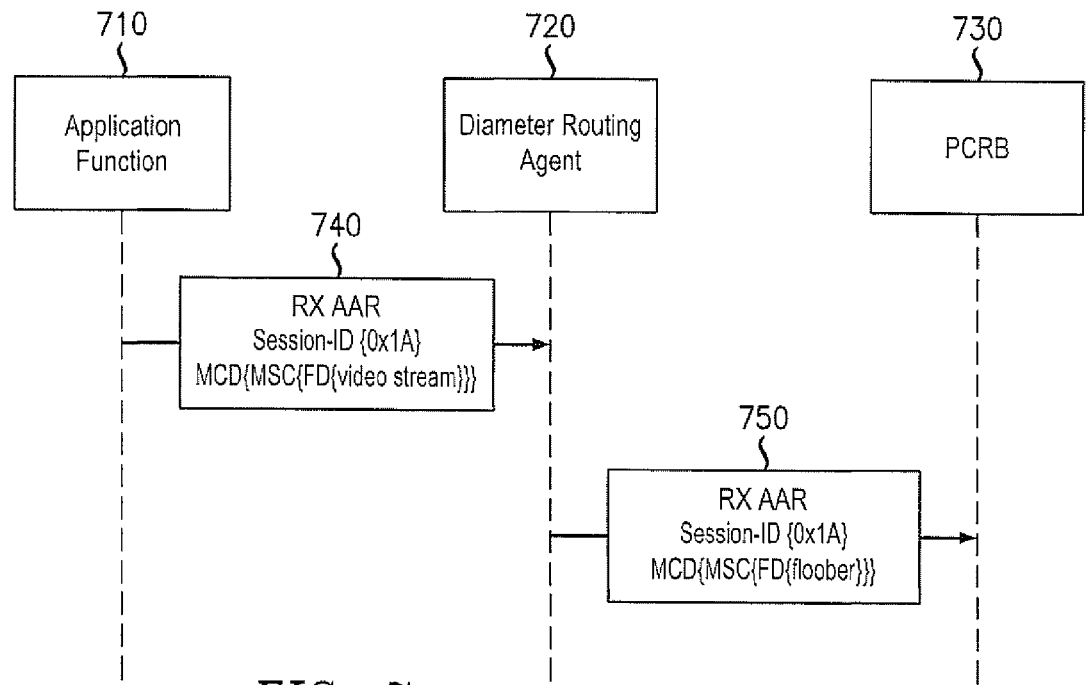
FIG. 7 illustrates an exemplary message exchange.

FIG. 7 illustrates an exemplary message exchange 700. Message exchange 700 may be based on DRA 720 applying a rule set similar to rule set 600. The message exchange 700 may begin when AF 710 transmits an Rx AAR Diameter message 740 to DRA 720. After establishing a context object representing the Rx AAR, a context object representing an Rx AAA, and any other appropriate context objects, a rule engine of DRA 720 may begin evaluating rule set 600.

First, DRA 720 may evaluate criteria node 610 by accessing a Session-ID attribute of the Rx AAR context object. This attribute may return a value of "0x1A" based on the received Rx AAR message 740. Based on this value, the rule engine may determine that criteria node 610 evaluates to "false." The rule engine may then proceed to evaluate result node 630 by accessing a "remove" action of the Rx AAR context object. The remove action may be associated with a Flow-Description object. This remove action may remove the Flow-Description AVP carrying the value "video stream" from the Rx AAR 740. The rule engine may then proceed to evaluate criteria node 640.

In criteria node 640, the rule engine may access a Media-Sub-Component attribute of the Rx AAR context object and determine whether such access returns any value, indicating that a Media-Sub-Component AVP is present in the received Rx AAR 740. Because the Rx AAR message 740 may include such a Media-Sub-Component AVP, criteria node 640 may evaluate to true, and the rule engine may proceed to evaluate result node 650. In result node 650, the rule engine may access an add function of the Rx AAR context object to add a new Flow-Description AVP having the value "floober" to the Rx AAR message. After evaluating result node 650, the rule engine may be finished evaluating rule set 600. DRA 720 may then transmit the modified Rx AAR message 750 to a PCRB 730.

As noted above, a user interface may facilitate a user in defining new rules for application by a rule engine. For example, a user interface may read or otherwise receive metadata associated with various context objects that may be available during rule evaluation, identify a number of available attributes or actions from the metadata, and present such attributes or actions to the user for inclusion in rule definitions. In various embodiments, attributes or actions may be associated with various types of values such as strings, integers, or enumerated values.

In the case of enumerated values, various standards may define acceptable enumerated values for each associated AVP. For example, a standard may specify that a CC-Request-Type AVP may include a value from the enumerated list of alphanumeric values {INITIAL_REQUEST, UPDATE_REQUEST, TERMINATION_REQUEST, EVENT_REQUEST}. As will be understood, such string values may be included for the sake of a user or other human viewer and, at run-time, may actually correspond to integer values, such as those in the set of numeric values {1, 2, 3, 4}, respectively. In various embodiments, however, some vendors may utilize enumerated values in addition to those specified in the relevant standards. For example, a vendor may utilize a CC-Request-Type AVP value of "5," which may correspond to a string such as "CONTINUITY_CHECK" or some other value. To facilitate creation of rules to handle such non-standard enumerated values, a user interface may enable a user to define rules that reference either the integer values or string values of the enumerated attribute or action.

FIG. 8 illustrates an exemplary method 800 for presenting enumerated context object components to a user. Method 800 may be performed upon a user requesting or otherwise performing an action that results in the display of available context object components. Method 800 may be performed by the components of DRA 200, such as user interface 225.

Method 800 may begin in step 805 and proceed to step 810 where the DRA may receive a request for context object attributes or actions via a GUI. For example, a user may indicate a desire to modify or create a rule set. Additionally or alternatively, a user may indicate a desire to view available attributes or actions for a specific context object. Method 800 may then proceed to step 815, where the DRA may retrieve or otherwise identify component metadata associated with the specified context object. Such metadata may include, for example, a list of user-friendly names for various attributes or actions. The metadata may be generated based on a context artifact or one or more message type definitions. Next, in step 820, the DRA may locate any attributes or actions that are associated with enumerated values. For example, the metadata may include, for each attribute or action, an associated data type. For each component located that is associated with an enumerated value, the DRA may generate an additional matching component. In various embodiments, this additional component may include the name of the original component appended with the suffix "-Enum." The original component may be associated with the integer version of the enumerated value while the "-Enum" component may be associated with the string version of the enumerated value. For example, the GUI may present the attribute "Gx CCR.CC-Request-Type" as returning an integer value, and may present the attribute "Gx CCR.CC-Request-Type-Enum" as returning a string value, such as a string in the set {INITIAL_REQUEST, UPDATE_REQUEST, TERMINATION_REQUEST, EVENT_REQUEST}. In various alternative embodiments, the GUI may instead present only one attribute or action representing the enumerated type AVP. In such embodiments, the GUI may perform string-to-integer translation to allow a user to specify either numeric or string values for a single attribute or action. Then, in step 830, the user interface may present the attributes or actions to the user via the GUI. For example, the user interface may present a list of available attributes or actions. Method 800 may then proceed to end in step 835.

Thus, according to exemplary method 800, the user interface may enable the user to define rules that access enumerated type values based on either the integer or text descriptions. When evaluating possible vendor-specific values, the user may check for the integer value without the DRA explicitly knowing the string value with which it is associated. When evaluating standard-defined enumerated values, the user may use the user-friendly string values. After defining the rule set, the user may publish the rules for use by the rule engine.

FIG. 9 illustrates an exemplary method 900 for publishing a rule set including references to enumerated context object components. Method 900 may be performed by the components of DRA 200 such as, for example, user interface 225.

Method 900 may begin in step 905 and proceed to step 910 where the DRA may receive a rule set for publication. For example, the user may indicate via a GUI that a one or more rule definitions are ready to be deployed. Next, in step 915, the DRA may locate any references to components within the rule definitions having the "-Enum" suffix. In step 920, the DRA may convert such references to their corresponding integer-type enumerated values. For example, a reference "Gx CCR.CC-Request-Type-Enum equals UPDATE_REQUEST" may be converted to a new reference "Gx CCR.CC-Request-Type equals 2." The DRA may then proceed to generate a rule tree based on the rule set definition. Such action may include converting pseudocode or other definition language into other commands for interpretation by a rule engine at runtime. In various embodiments wherein rule sets are stored in data structures other than trees, appropriate modifications will be apparent.

According to the foregoing, various embodiments enable robust and dynamic handling of various Diameter messages at a diameter routing agent. In particular, by including a rules engine capable of reference various context objects representing various Diameter messages, a user may provide rules capable of defining behavior based on, for example, the content of a received message or the content of a previously processed message. Further, by providing definitions of such messages, the rule engine may be able to process rules that reference aspects or characteristics specific to those message types. Various additional benefits will be apparent from the foregoing disclosure.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
    receiving a Diameter message at the DRA from an origin device;
    determining a received message type of the received Diameter message;
    determining an inverse message type based on the received message type;
    establishing an inverse message context object based on the inverse message type, wherein the inverse message context object provides access to a related Diameter message of the received Diameter message;
    processing the received Diameter message, wherein processing includes accessing the inverse message context object; and
    transmitting a message based on the processing.

2. The method of claim 1, wherein establishing the inverse message context comprises:
    locating a message definition for the inverse message type;
    establishing the inverse message context object based on the message definition; and
    associating the inverse message context object with the related Diameter message.

3. The method of claim 1, wherein the received Diameter message is a Diameter request message, the method further comprising generating a new Diameter answer message as the related Diameter message of the Diameter request message.

4. The method of claim 3, wherein:
    processing the received Diameter message comprises invoking an action of the inverse message context object, wherein the action modifies the Diameter answer message, and
    transmitting the message based on the processing comprises transmitting the Diameter answer message to the origin device.

5. The method of claim 1, wherein the received Diameter message is a Diameter answer message, the method further comprising retrieving a previously processed Diameter request message as the related Diameter message of the Diameter answer message.

6. The method of claim 5, wherein:
    processing the received Diameter message comprises reading an attribute of the inverse message context object, and
    transmitting the message based on the processing comprises transmitting the Diameter answer message to another device.

7. The method of claim 1, wherein processing the received Diameter message comprises evaluating a rule that includes a reference to the inverse message context object, wherein the evaluation includes accessing the inverse message context object based on the reference.

8. A Diameter routing agent (DRA) for processing a Diameter message, the DRA comprising:
    a Diameter stack configured to receive a Diameter message at the DRA from an origin device;
    a message handler configured to:
        determine a received message type of the received Diameter message, and
        determine an inverse message type based on the received message type;
    a context creator configured to establish an inverse message context object based on the inverse message type, wherein the inverse message context object provides access to a related Diameter message of the received Diameter message; and
    a processing engine configured to process the received Diameter message, wherein processing includes accessing the inverse message context object,
    wherein the message handler is further configured to transmit a message based on the processing.

9. The DRA of claim 8, further comprising a message dictionary storage configured to store a message definition for the inverse message type wherein, in establishing the inverse message context object based on the message type, the context creator is configured to:
    locate the message definition;
    establish the inverse message context object based on the message definition; and
    associate the inverse message context object with the related Diameter message.

10. The DRA of claim 8, wherein the received Diameter message is a Diameter request message and the context creator is further configured to generate a new Diameter answer message as the related Diameter message of the Diameter request message.

11. The DRA of claim 10 wherein:
    in processing the received Diameter message, the processing engine is configured to invoke an action of the inverse message context object, wherein the action modifies the Diameter answer message, and in transmitting the message based on the processing, the message handler is configured to transmit the Diameter answer message to the origin device.

12. The DRA of claim 8, wherein the received Diameter message is a Diameter answer message, and the Diameter stack is further configured to retrieve a previously processed Diameter request message as the related Diameter message of the Diameter answer message.

13. The DRA of claim 12, wherein:
in processing the received Diameter message, the processing engine is configured to read an attribute of the inverse message context object, and
in transmitting the message based on the processing, the message handler is configured to transmit the Diameter answer message to another device.

14. The DRA of claim 8, wherein the processing engine is a rule engine and, in processing the received Diameter message, the rule engine is configured to evaluate a rule that includes a reference to the inverse message context object, wherein the evaluation includes accessing the inverse message context object based on the reference.

15. A non-transitory machine-readable storage medium encoded with instructions for execution by a Diameter Routing Agent (DRA) for processing a Diameter message, the medium comprising:
instructions for receiving a Diameter message at the DRA from an origin device;
instructions for determining a received message type of the received Diameter message;
instructions for determining an inverse message type based on the received message type;
instructions for establishing an inverse message context object based on the inverse message type, wherein the inverse message context object provides access to a related Diameter message of the received Diameter message;
instructions for processing the received Diameter message, wherein processing includes accessing the inverse message context object; and
instructions for transmitting a message based on the processing.

16. The non-transitory machine-readable storage medium of claim 15, wherein the instructions for establishing the inverse message context comprise:
instructions for locating a message definition for the inverse message type;
instructions for establishing the inverse message context object based on the message definition; and
instructions for associating the inverse message context object with the related Diameter message.

17. The non-transitory machine-readable storage medium of claim 15, wherein the received Diameter message is a Diameter request message, the medium further comprising instructions for generating a new Diameter answer message as the related Diameter message of the Diameter request message.

18. The non-transitory machine-readable storage medium of claim 17, wherein:
the instructions for processing the received Diameter message comprise instructions for invoking an action of the inverse message context object, wherein the action modifies the Diameter answer message, and
the instructions for transmitting the message based on the processing comprise instructions for transmitting the Diameter answer message to the origin device.

19. The non-transitory machine-readable storage medium of claim 15, wherein the received Diameter message is a Diameter answer message, the medium further comprising instructions for retrieving a previously processed Diameter request message as the related Diameter message of the Diameter answer message.

20. The non-transitory machine-readable storage medium of claim 19, wherein:
the instructions for processing the received Diameter message comprise instructions for reading an attribute of the inverse message context object, and
the instructions for transmitting the message based on the processing comprise instructions for transmitting the Diameter answer message to another device.

* * * * *